US006619042B2

(12) United States Patent
Nadig

(10) Patent No.: US 6,619,042 B2
(45) Date of Patent: Sep. 16, 2003

(54) DEAERATION OF MAKEUP WATER IN A STEAM SURFACE CONDENSER

(75) Inventor: Ranga Nadig, Cherry Hill, NJ (US)

(73) Assignee: Holtec International, Inc., Marlton, NJ (US)

( * ) Notice: Subject to any disclaimer, the term of this patent is extended or adjusted under 35 U.S.C. 154(b) by 73 days.

(21) Appl. No.: 09/969,247

(22) Filed: Oct. 1, 2001

(65) Prior Publication Data

US 2003/0061814 A1 Apr. 3, 2003

(51) Int. Cl.[7] .............................................. F01K 19/10
(52) U.S. Cl. ............................................ 60/688; 60/685
(58) Field of Search .................................. 60/685, 688

(56) References Cited

U.S. PATENT DOCUMENTS

| | | | | |
|---|---|---|---|---|
| 3,820,334 A | * | 6/1974 | Heller | 60/688 |
| 3,834,133 A | * | 9/1974 | Bow | 96/181 |
| 4,631,925 A | * | 12/1986 | Ohtake et al. | 60/688 |
| 4,788,824 A | * | 12/1988 | Spurr et al. | 60/671 |
| 6,038,849 A | * | 3/2000 | Nakhamkin et al. | 60/775 |
| 6,145,315 A | * | 11/2000 | Blangetti et al. | 60/646 |
| 6,233,941 B1 | * | 5/2001 | Youssef | 60/670 |

* cited by examiner

*Primary Examiner*—Hoang Nguyen
(74) *Attorney, Agent, or Firm*—Brian L. Belles; Michael B. Fein; Cozen O'Connor

(57) ABSTRACT

A power plant apparatus comprising a condenser for condensing turbine exhaust steam having a steam dome, a steam inlet, a tube bundle, a hot well for collecting condensate, an air removal section, an internal makeup water heater bundle. An internal makeup water header which includes a pipe having spray nozzles arranged counter-current to the flow of steam introduced by the steam inlet is used to introduce heated makeup water into the exhaust stream from the turbine within the condenser.

19 Claims, 1 Drawing Sheet

DEAERATION OF MAKEUP WATER IN A STEAM SURFACE CONDENSER

BACKGROUND OF THE INVENTION

This invention relates in general to power plants having steam turbines, steam surface condensers, and makeup water. Specifically, the invention relates to steam surface condenser apparatus which condense steam flowing out of the exhaust of the steam turbines and to methods of deaeration of makeup water.

In power plant applications with steam as the drive fluid, condensate loses in the cycle are compensated by the addition of the makeup water. Normally, demineralized makeup water saturated with air is admitted in the steam surface condenser. The steam surface condenser is expected to deaerate the makeup water. In most instances, the makeup flowrate into the condenser is small, approximately 1% of the turbine exhaust steam flow rate. Such small flow rates of makeup water can be adequately deaerated in the condenser without the use of any special hardware.

In certain applications, depending upon the cycle requirements, large amounts of makeup water can be admitted into the condenser. The makeup water flowrate can be as high as 20%–30% of the steam flow rate. Deaeration of large quantities of makeup water is carried out in special hardware located external to the steam surface condenser. External vacuum deaerators utilizing spray and tray heating are commonly used for deaeration of makeup water in many applications. In an external vacuum deaerator, the makeup water is sprayed in a cylindrical shaped vessel. Turbine exhaust steam is admitted into the cylindrical shaped vessel from the lower side. The makeup water comes in contact with turbine exhaust steam, gets heated, and liberates the dissolved air. The make up water then falls through a series of trays located in the lower section of the cylindrical shaped vessel, effecting further deaeration.

The use of external deaerators has several known disadvantages, not the least among them being the amount of real estate space taken up, the need to inspect, operate, and maintain the a separate piece of hardware. There has been a long felt need in this art to provide a way to deaerate the make up water internal to the condenser and reduce or eliminate the external makeup water deaerators.

It is an object of the present invention to provide an improved method and apparatus for introducing makeup water to a steam surface condenser and deaerating the makeup water.

It is a further object to reduce the size or eliminate entirely the external deaerators used with steam surface condensers in steam turbine power plant applications.

SUMMARY OF THE INVENTION

These objects, and others which will become apparent from the following disclosure and drawings, are achieved by the present invention which comprises in one aspect deaeration of large quantity of cold makeup water, saturated with air, by the use of a two stage deaeration technique wherein the entire deaeration hardware is located inside the condenser.

The power plant apparatus of the invention comprises a condenser for condensing turbine exhaust steam having a steam dome, a steam inlet, a tube bundle, a hot well for collecting condensate, an air removal section, an internal makeup water heater bundle, and apparatus to introduce makeup water into said steam dome. The preferred apparatus to introduce makeup water into the steam dome is an internal makeup water header which is a pipe having spray nozzles which, most preferably, are self adjusting.

The spray nozzles are arranged, in most embodiments, counter-currently to the flow of steam introduced by the steam inlet. The system preferably extracts air at the outlet of the internal makeup water heater bundle.

The makeup water heater bundle, located internal to the steam dome, comprises preferably of a series of U-tubes.

The local air extraction can be performed by a air evacuation device or automatic air release valve at the outlet of the internal makeup water heater bundle.

According to the process aspect of the invention, a makeup water heater bundle section is arranged within the condenser and the resultant heated makeup water is introduced into the path of the turbine exhaust steam within the steam dome. In the makeup water heater bundle, the makeup water is preferably heated to a temperature of 5.0° F. below the saturation temperature of the turbine exhaust steam section. The makeup water is further heated to the saturation temperature of the turbine exhaust steam by direct contact.

The air liberated from the makeup water in the bundle section is preferably automatically and periodically vented prior to introducing the resultant heated makeup water into the condenser.

The resultant heated makeup water is introduced using spray nozzles in a direction countercurrent to the turbine exhaust stream in a preferred process of the invention. In general, it is preferred that the spray nozzles are arranged so as to maximize the contact time between the turbine exhaust steam and the makeup water.

It is further preferred to provide an oversized air cooling zone in the said condenser so as to improve the venting capability.

A hooded air channel within the condenser may be provided to prevent dripping condensate from coming in contact with the air-vapor mixture.

DETAILED DESCRIPTION OF THE PREFERRED EMBODIMENTS

Figure 1:
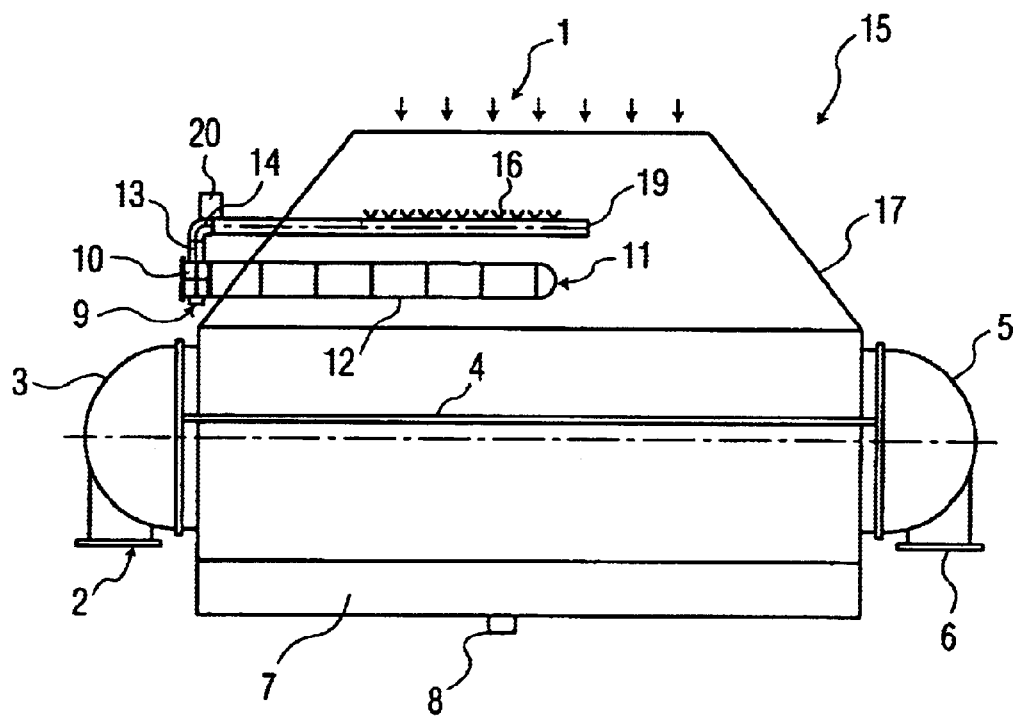
FIG. 1 is a front cross-sectional view of a steam surface condenser of the invention.

Referring to FIG. 1, which shows a steam surface condenser system 15 of the invention, turbine exhaust steam 1 enters the dome 17 area at the top of the condenser 15. Cold cooling water 2 enters the inlet water box 3, flows through the condenser tubes 4, collects in the return waterbox 5, and exits the condenser 6.

The turbine exhaust steam 1 flows through the steam dome 17, comes in contact with the condenser tubes 4 carrying cold water on the inside, condenses, and collects in the hotwell 7 at the bottom of the steam surface condenser 15. The condensate collects in the hotwell 7 and flows out thorough the condenser outlet 8. This condensation is the normal function of a steam surface condenser.

As shown in FIG. 1, the two stage deaeration hardware is located in the condenser steam dome 16 and consists of a makeup water heater bundle 11 and a connecting makeup water header 19 equipped with self adjusting spray nozzles 16. The makeup water heater bundle tubes 12, supplied by makeup water through inlet 9 though channel 10. Makeup water exits the makeup water header 9 though outlet 13, where air is liberated from the makeup water though evacuation outlet 14.

In the first stage deaeration, cold makeup water enters the channel 10 of the makeup water heater bundle 11 through inlet 9 and flows inside the tubes 12. The turbine exhaust steam 1 is flowing on the outside of the makeup water heater bundle tubes 12. The turbine exhaust steam 1 condenses on the outside of the cold makeup water heater bundle tubes 12, thereby heating the makeup water. The makeup water heater bundle 11 is designed such that the makeup water is heated to a temperature about 5.0° F. below the saturation temperature of the turbine exhaust steam 1. The heated makeup water exits the makeup water heater bundle 11 at makeup water outlet 13. As the makeup water heats up, the solubility of air in makeup water decreases. Air liberated from the heated makeup water at outlet 13 is collected and expelled though makeup water evacuation outlet 14 to the ambient. An automatic air release valve 20 can be positioned at water evacuation outlet 14 to control the expelling of the liberated air. Air release valve 20 can also be an air extraction device. The heating of the makeup water, removal and evacuation of dissolved air is termed as "First Stage Deaeration"

In the second stage, the heated, deaerated makeup water, with temperature 5° F. below the saturation temperature of turbine exhaust steam 1, is admitted into the makeup water header 19 and is then sprayed into the steam space of the steam dome 17 through self adjusting spray nozzles 16. The spray nozzles 16 are located such that the makeup water is sprayed in the direction counter-current to the flow of the turbine exhaust steam 1 and in the form of fine droplets. The turbine exhaust steam 1 comes in contact with the makeup water droplets and condenses on the droplets. The latent heat of condensation heats up the makeup water spray to the same temperature as the turbine exhaust steam 1. The large height of the condenser 15 and the steam dome 17 permits the makeup water droplets to be in contact with the turbine exhaust steam for a long period of time. The heating of make up water and it's prolonged exposure to the turbine exhaust steam expels the dissolved air. The liberated air is collected in the centrally located air channel and expelled to the ambient by the air evacuation package. The direct contact heating of the makeup water by the turbine exhaust steam, subsequent liberation and removal the of the dissolved air is termed as "Second Stage Deaeration".

Figure 2:
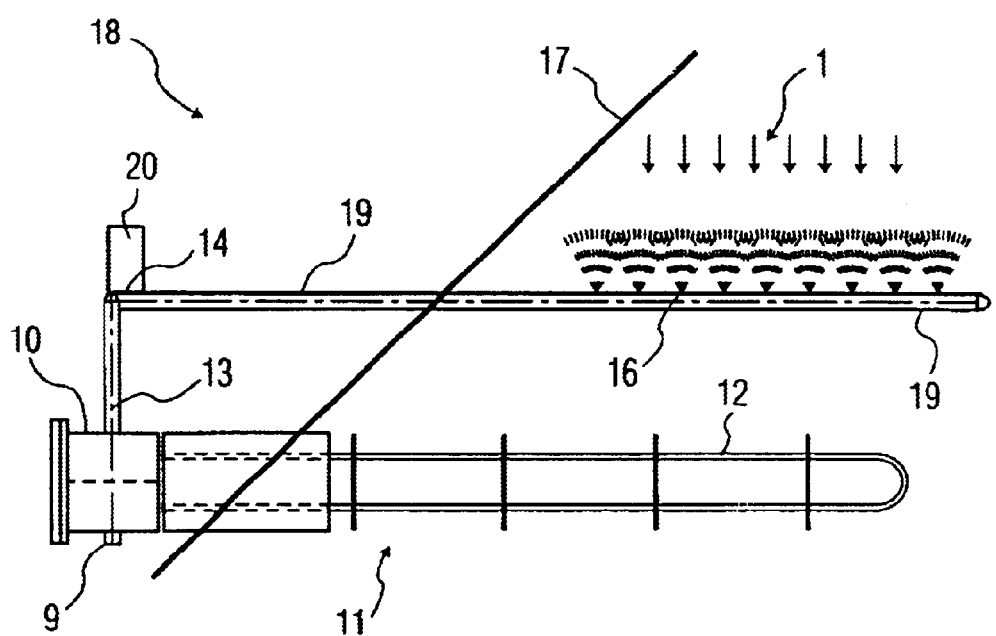
FIG. 2 is a front elevational view, partially in cross-section, of a makeup water heating bundle having spray nozzles according to the invention.

The two stage deaeration hardware 18 (FIG. 2), is located inside the steam dome 17 (FIG. 1). The entire hardware can be installed in the factory. Thus shipment, storage, and installation, operation and maintenance activities at the jobsite are totally eliminated.

The external vacuum deaerators of the prior art are avoided by the invention, thereby eliminating a piece of equipment and the associated need for installation, operation and maintenance. The valuable real estate in the power plant taken up by the external vacuum deaerators is eliminated.

In typical external vacuum deaerator applications of the prior art, large diameter pipes are required to transport the turbine exhaust steam from the condenser steam dome to the external vacuum deaerator. The pressure drop in the steam pipe can have an adverse affect the performance of the deaerator, especially in condensers with low operating pressures.

Steam pipes are not required in the technique of the invention wherein the hardware is located in the steam dome. Pressure drop and associated performance problems of the prior art are eliminated.

With prior art external deaerators, relatively small mixing distances are available for deaeration of makeup water. In the apparatus and method of the invention, the entire height of the shell and the steam dome is available for deaeration of makeup water.

While the invention and the preferred embodiments have been described in detail, various alternative embodiments, alternatives, and improvements should become apparent to those skilled in the art without departing from the spirit and scope of the invention.

What is claimed is:

1. A power plant apparatus comprising a condenser for condensing turbine exhaust steam having a steam dome, a steam inlet, a tube bundle, a hot well for collecting condensate, an air removal section, an internal makeup water heater bundle, and means to introduce makeup water into said steam dome.

2. Apparatus according to claim 1 wherein said means to introduce makeup water into said steam dome is an internal makeup water header.

3. Apparatus according to claim 2 wherein said internal makeup water header is a pipe having spray nozzles.

4. Apparatus according to claim 3 wherein said spray nozzles are self adjusting.

5. Apparatus according to claim 3 wherein said spray nozzles are arranged to spray makeup water counter-current to flow of steam introduced by the steam inlet.

6. Apparatus according to claim 1 further including an internal makeup water header having air extraction means.

7. Apparatus according to claim 6 wherein said air extraction means is at the outlet of said internal makeup water heater bundle.

8. Apparatus according to claim 1 wherein said internal makeup water heater bundle comprises a plurality of straight or U-tubes.

9. Apparatus according to claim 1 wherein said internal makeup water heater bundle is located internal to said steam dome.

10. Apparatus according to claim 1 further including an internal makeup water heater having air extraction device or automatic air release valve at the outlet of said internal makeup water heater bundle.

11. Apparatus according to claim 10 wherein the said internal makeup water heater bundle comprises a plurality of straight or U-tubes located internal to said steam dome and containing an air extraction device or automatic air release valve at the outlet of said internal makeup water heater bundle; and said means to introduce makeup water into said steam dome is an internal makeup water header comprising a pipe having self adjusting spray nozzles arranged to spray makeup water counter-current to flow of steam introduced by said steam inlet.

12. A process for use in a power plant having a steam turbine and a condenser for condensing exhaust steam from said turbine comprising heating makeup water in a makeup water hearer bundle section within said condenser to a desired temperature; and introducing the resultant heated makeup water into exhaust steam from said turbine within said condenser.

13. The process of claim 12 wherein said desired temperature is approximately 5.0° F. below the saturation temperature of the turbine exhaust steam and is further heated upon introduction to said exhaust stream to the saturation temperature of the turbine exhaust steam.

14. The process of claim 12 wherein air liberated from said makeup water in said bundle section is automatically and periodically vented prior to introducing said resultant heated makeup water into said condenser.

15. The process of claim 12 wherein said resultant heated makeup water is introduced using spray nozzles in a direction countercurrent to said turbine exhaust steam.

16. The process of claim 15 wherein said spray nozzles are directed in a direction opposite to the flow of turbine exhaust steam.

17. The process of claim 16 wherein said spray nozzles are arranged so as to maximize the contact time between said turbine exhaust steam and said makeup water.

18. The process of claim 12 further including providing an oversized air cooling zone in said condenser so as to reduce vapor in air vapor mixture and improve venting.

19. The process of claim 12 further including providing a hooded air channel within said condenser so as to prevent dripping condensate contacting air vapor mixture.

* * * * *